(Model.)

P. PATTERSON.
Coupling for Tubing.

No. 243,608.                              Patented June 28, 1881.

Witnesses
A. Hanauer
E. W. Otto

Inventor
Peter Patterson
by James I. Kay
Attorney

United States Patent Office.

PETER PATTERSON, OF McKEESPORT, ASSIGNOR TO HIMSELF AND EDMUND C. CONVERSE, OF PITTSBURG, PENNSYLVANIA.

COUPLING FOR TUBING.

SPECIFICATION forming part of Letters Patent No. 243,608, dated June 28, 1881.

Application filed April 13, 1881. (Model.)

*To all whom it may concern:*

Be it known that I, PETER PATTERSON, of McKeesport, in the county of Allegheny and State of Pennsylvania, have invented a new and useful Improvement in Unions or Couplings for Tubing; and I do hereby declare the following to be a full, clear, and exact description thereof, reference being had to the accompanying drawings, forming a part of this specification, in which—

Figure 1:
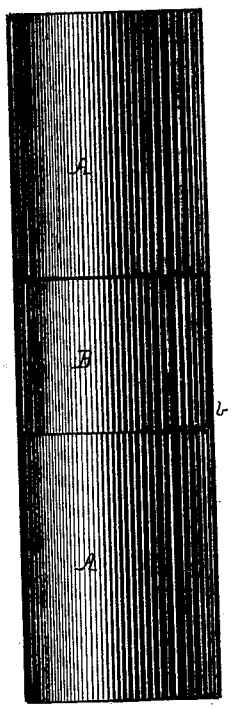
Figure 2:
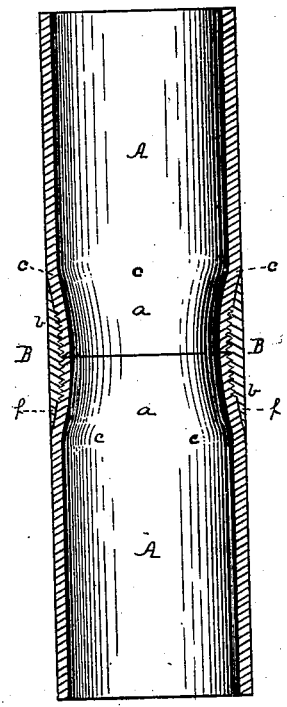
Figure 3:
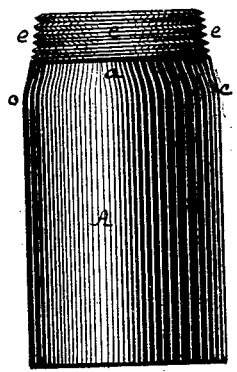
Figure 4:
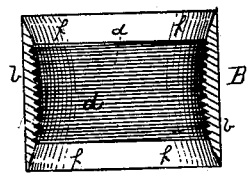

Figure 1 is a side view of my improved union or joint, showing two sections of tubing secured together. Fig. 2 is a longitudinal section of the same. Fig. 3 is a side view of one end of a tube-section illustrating my invention; and Fig. 4 is a sectional view of the coupling or union.

Like letters of reference indicate like parts in each.

My invention relates to certain improvements in unions or couplings for securing together the different sections of wrought-metal tubing; and its object is to form a union in which the surface of the body of the tubing and of the coupling uniting the different sections are approximately flush with each other, so that the connected tubing will not occupy a space longer than the diameter of the body of the tubing.

My invention is especially adapted for use in uniting the drive-pipe used in oil-wells outside of the casing to prevent the caving in of the earth between the surface and the bed-rock. Experience has shown that where the common joint is used, as the pipe is driven down the couplings extending out beyond the pipe catch on the earth and greatly retard the driving of the pipe, and that the same objection is encountered in withdrawing the pipe. By my invention the surfaces of the pipe and coupling are approximately even, and the driving or withdrawing of the pipe is in no way retarded by the coupling or union.

My improved union is formed of the pipe or tubing having contracted ends threaded on the exterior and a coupling correspondingly threaded and fitting around the contracted ends of the tubing, a coupling of smaller size being thus employed, and its outer surface being approximately flush with the body of the pipe.

To enable others skilled in the art to make and use my invention, I will describe its construction and manner of use.

In the drawings, A A represent parts of two different lengths or sections of wrought-metal tubing united by the coupling B. A short distance above the ends of the tubing they are slightly contracted, as at *a*, this contraction reducing the diameter of the tube between it and the end of the tube. The contraction of the tube can be most readily formed by heating the ends of the tube and swaging it down between a pair of semicircular concave hammer-dies. This swaging of the tube will reduce the end slightly in diameter and generally cause a slight thickening of the walls of the tube, thereby increasing its strength. The length of the contraction or reduction will depend on the length of the coupling B used therewith, and the amount of the contraction upon the thickness of the walls of the coupling. The body of the contraction is generally formed with a very slight taper, the smallest diameter being at the mouth of the tube, and it is connected with the body of the pipe by the bevel *c*. As my improved coupling is used mostly with drive-pipe which are generally over eight inches in diameter the contraction of the tube is scarcely perceptible on the interior. After the tube has been contracted, as above set forth, the contracted end is threaded in the usual way on the exterior, as at *e*, the thread extending from the mouth to the base of the bevel *c*, where it gradually fades away.

The coupling B is made of metal in the usual manner, and its outer surface, *b*, is approximately of the same diameter as the body of the tubing, its inner threaded surface, *d*, corresponding in diameter and in thread to the threaded portion *e* of the contraction *a* of the tube, and both the tube and coupling are preferably provided with what is termed a "taper thread," as shown, the thickest part of the coupling being at the center, this taper thread enabling the tube to enter the coupling more easily and giving a stronger joint. The coupling is formed double the length of the contraction *a* from the top of the bevel *c* to the mouth, so that when uniting two sections of tubing it will fit neatly around the contracted portions, and its face be about flush with that of the tubing. On either side of the threaded portion $d$ is the outwardly-tapering annular lip $f$, this lip gradually thinning and corresponding in curve to that of the bevel $c$ of the tubing, so as to extend up along the bevel and strengthen or brace the union of the coupling and tubing.

My improved union is used in the following manner: The contracted end $a$ of one tube A is first screwed into the coupling until the tapered lip $f$ fits up around the bevel or taper $c$ of the tube, and then the contracted end of the tubing to be connected is screwed into the other end of the coupling until the tapered lip of the coupling fits around its bevel, and the ends of the two sections of tubing are butted together within the coupling. As the coupling B fits around the contracted ends of the tubes, and its outer surface is of about the same diameter as the body of the tubing, I thus obtain a union in which the faces of the coupling and pipe are approximately flush with each other, and there is no edge of the coupling extending beyond the body of the tubing to catch in the earth and retard the driving or withdrawing of the tubing, or to occupy more space than that necessary for the tubing. The tapering lips of the coupling also serve to brace the tubing and guard against breakage by side strains. As the ends of the two tube-sections meet within the coupling and butt against each other, the blows in driving the pipe into the ground are transmitted from one tube-section to another without in any way affecting or injuring the thread of the coupling or pipe, and the force of the blow is thus fully carried through the tube-sections in driving the pipe.

Another advantage of my improved union in its use with the drive-pipe is, that the sections are prevented from telescoping, not only by being butted together, but by the taper-threaded joint and the tapering annular lip of the coupling fitting around the bevel of the contracted portion of the pipe, all these parts combining together to form a very tight strong joint, that will withstand very heavy jars before permitting any movement of the parts. The ends of the pipe are also surrounded by the coupling, and hence prevented from spreading. In swaging down the contracted ends of the tubing their interior diameter is very little reduced, and the reduction has no perceptible effect upon the flow of the liquids through the pipe.

It is evident that my improved union possesses many advantages for all kinds of tubing and can be employed in many different uses of tubing.

What I claim as my invention, and desire to secure by Letters Patent, is—

1. The improved union for tubing herein described, formed of the tubing having contracted ends threaded on the exterior, and the coupling correspondingly threaded and fitting around the contracted ends, the exterior of the coupling being approximately of the same diameter with the body of the tubing, substantially as and for the purposes set forth.

2. The combination of the tubing A, having the contracted ends $a$ externally threaded, and the bevel $c$, with the coupling B, of approximately the same external diameter with the body of the tubing, said coupling being correspondingly threaded and provided with the tapering annular lip adapted to fit around the bevel $c$ of the tubing, substantially as and for the purposes set forth.

In testimony whereof I, the said PETER PATTERSON, have hereunto set my hand.

PETER PATTERSON.

Witnesses:
 FRANCIS L. CLARK,
 JAMES I. KAY.